United States Patent
Iyer

(10) Patent No.: US 6,724,848 B1
(45) Date of Patent: Apr. 20, 2004

(54) SYNC REGENERATION IN A UNIVERSAL SERIAL BUS

(75) Inventor: Venkat Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/519,511

(22) Filed: Mar. 6, 2000

(51) Int. Cl.7 ................................................ H04L 7/00
(52) U.S. Cl. ...................... 375/368; 375/211; 375/372
(58) Field of Search ................................ 375/211, 213, 375/373, 374, 214, 215, 372, 362, 365, 366, 368; 710/300, 108, 305, 310; 370/503, 509

(56) References Cited

U.S. PATENT DOCUMENTS

| | | | | |
|---|---|---|---|---|
| 5,457,718 A | * | 10/1995 | Anderson et al. | 375/373 |
| 5,963,602 A | * | 10/1999 | Aoki et al. | 375/354 |
| 6,111,437 A | * | 8/2000 | Patel | 327/74 |
| 6,298,103 B1 | * | 10/2001 | Huang et al. | 375/355 |
| 6,381,666 B1 | * | 4/2002 | Kejser et al. | 710/300 |
| 6,487,155 B1 | * | 11/2002 | Carson et al. | 369/59.13 |
| 6,536,011 B1 | * | 3/2003 | Jang et al. | 714/814 |
| 2002/0176526 A1 | * | 11/2002 | Mejia | 375/372 |

* cited by examiner

Primary Examiner—Jean B. Corrielus
(74) Attorney, Agent, or Firm—Steven D. Yates

(57) ABSTRACT

A Universal Serial Bus repeater is provided, comprising a method and apparatus for detecting a specified data pattern and regenerating or retransmitting the recognized data pattern. In some embodiments, the invention recognizes an end of sync signal, and is operable to retransmit the end of sync signal and the following data that is presumed to be valid as a result of sync recognition. In other embodiments, the invention recognizes and retransmits a properly aligned end of packet signal, the size of which is dependent on detection of whether the end of packet signal is a part of a start of frame packet.

10 Claims, 3 Drawing Sheets

SYNC REGENERATION IN A UNIVERSAL SERIAL BUS

FIELD OF THE INVENTION

The invention relates generally to universal serial buses in computers, and more specifically to regeneration of a synchronization signal in a universal serial bus device or repeater.

BACKGROUND OF THE INVENTION

A Universal Serial Bus (USB) is a common feature of today's computers, and provides a flexible and inexpensive interface through which the computer can exchange data with peripheral devices.

USB is an industry standard bi-directional interface system, developed with a focus on connectivity to voice and compressed video sources such as telephone applications, and with a focus on ease of use for the end user. The system is also flexible in the data it receives, including the ability to receive isochronus data that is provided at an arbitrary or self-clocking rate such as sampled audio signals.

Because of its flexibility, the USB interface is also suitable for use with traditional interface devices such as keyboards, mice, printers and scanners. The USB interface is a bus interface, enabling attachment and use of multiple devices to a single USB interface port. An added benefit to using a USB interface is the ability of USB devices to self-configure or to operate as plug-and-play devices, eliminating the need for consumers to understand and configure multiple ports such as serial and parallel ports, keyboard ports, mouse ports, and joystick interfaces.

Devices on a USB bus are attached via a single standard interface connection, and electrical details such as bus termination are isolated from the end user. USB devices can be dynamically attached or configured, and can self-identify and configure themselves upon connection to a computer system. The bus supports concurrent operation of many devices at a time, and is designed with a low bus protocol overhead to enable high data utilization of the available bus bandwidth. The bus protocol is designed to be flexible, and supports a wide range of packet sizes and a wide range of device buffering options and latency with integrated flow control.

Each USB bus system has a host, which is typically an interface adapter in a computer system. Each host has one or more hubs, each of which provides connectivity to one or more nodes or devices. Each hub may also provide connectivity to one or more other hubs, which in turn may each provide connectivity to multiple nodes or devices. Each hub is capable of receiving data from the nodes, the host, or from another hub, and is capable of repeating or retransmitting the data to another host or hub on the bus. A series of up to five hubs may separate any particular USB device from the USB host, allowing a large number of devices to be controlled by a single host.

Current USB hubs are designed to repeat or retransmit data before a valid synchronization (sync) signal is detected. This makes these devices somewhat susceptible to noise, or to the risk that random noise will initiate spurious repeater operation. A revision of the USB specification (USB Specification 2.0, under development) requires in some embodiments that devices which receive and repeat USB data signals over the USB bus must wait until receiving a signal indicating the end of a sync signal before enabling a transmitter to repeat data. Such devices have a greater need for the ability to distinguish valid signals from noise than previous generations of USB system devices, due in part to a reduction in data signal voltage from 3.3 volts to 400 millivolts in the USB 2.0 specification. What is needed is a method and apparatus of detecting and retransmitting the sync field in a manner which provides low delay and low gate count.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a method and apparatus that detect and retransmit the end of sync field or another selected data pattern of a USB data stream using a low gate count and low delay solution. Such devices are less susceptible to being activated by random noise, such as spurious repeater activation and retransmission of noise. The invention in some embodiments regenerates or realigns the detected selected data pattern, making detection and retransmission of data nondestructive to the data stream. The invention compensates in part for an increased demand for noise immunity in future versions of the USB system, which are likely to feature signal levels such as a proposed level of 400 millivolts that are substantially lower than the previous signal level of 3.3 volts. The repeater of the invention is incorporated as a part of hubs in USB systems, which link various devices and a USB host.

Figure 1:
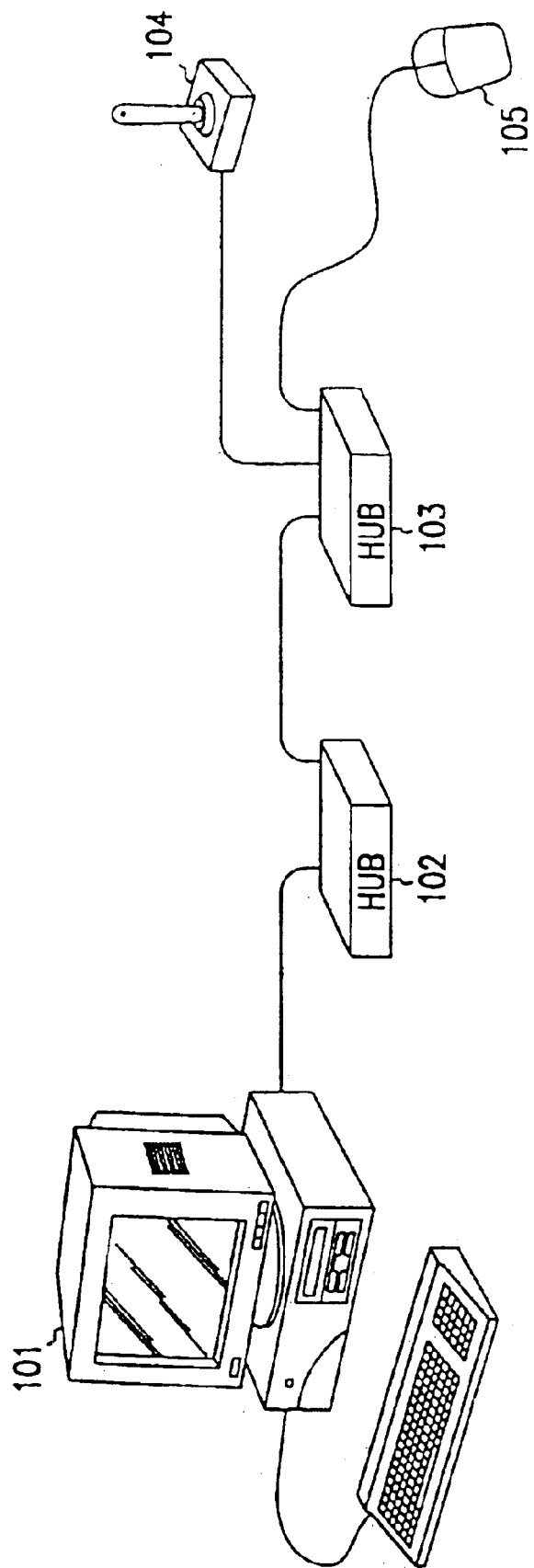
FIG. 1 shows a block diagram of a typical Universal Serial Bus system configuration, consistent with the prior art.

FIG. 1 shows a block diagram of an exemplary Universal Serial Bus system. A standard personal computer is shown at 101, which in this embodiment of the invention incorporates a USB host adapter that serves as the USB system host device. The personal computer 101 is connected via the host adapter to a first hub 102, which is in turn connected to a second hub 103. In various embodiments, up to five hubs may be serially connected to link USB devices to a USB host, and each hub may link to more than one other hub. In this example, the second hub 103 is connected to two USB devices—a joystick 104 and a mouse 105. Any number of devices, including other devices such as computer telephony devices may be attached to any hub in the USB system in various embodiments.

In operation, data is passed between the devices such as joystick 104 and mouse 105 by transmitting data over the USB connections linking the devices to the second hub 103, the second hub 103 to the first hub 102, and the first hub to the USB host adapter of personal computer 101. The data is received in each hub and is repeated, such that each hub serves to retransmit data and facilitate communication between the host 101 and the devices 104 and 105.

Figure 2:
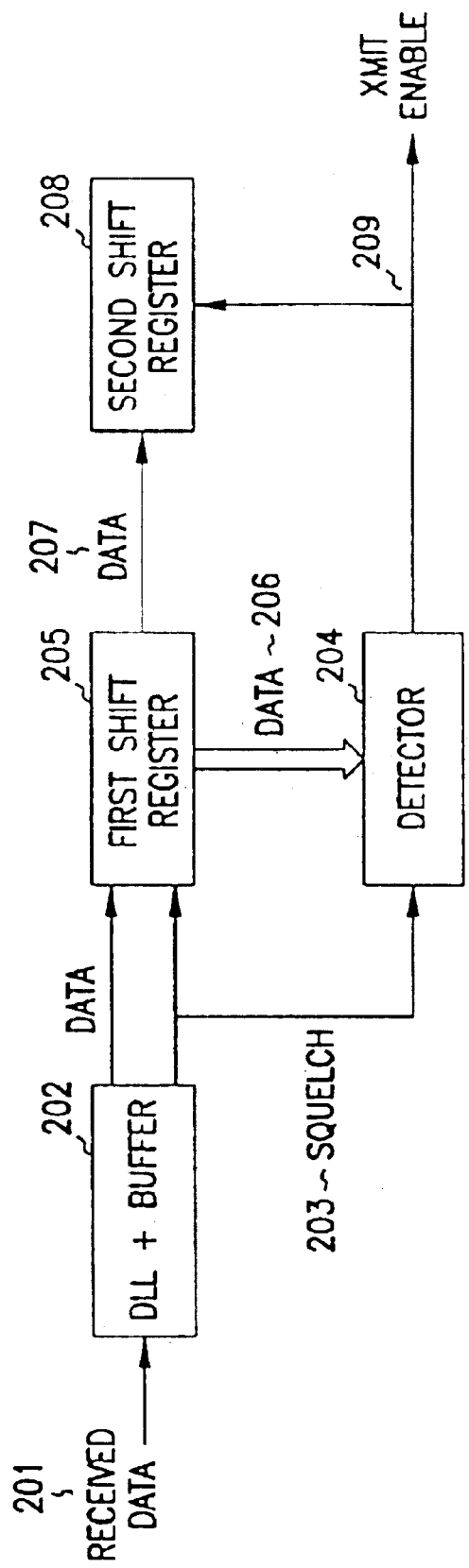
FIG. 2 shows a block diagram of a Universal Serial Bus repeater circuit consistent with an embodiment of the present invention.

FIG. 2 shows one embodiment of the present invention, which employs a method and apparatus to detect and repeat an end of sync signal to ensure that only valid data and not noise is passed between the host 101 and the devices 104 and 105. The repeater typically comprises a part of hubs 102 and 103, which receive and repeat data signals to enable communication between linked devices on the USB bus.

Received data 201 is provided to a digital locked loop (DLL) and buffer circuit 202, which receives the data and generates a clock signal from the rate of data received. The clock signal is in various embodiments generated by a phase-locked loop, a digital locked loop or digital phase-locked loop, or any other suitable means of generating a clock signal from a received digital data signal. The received data is stored in a buffer, and is retransmitted from the buffer at a constant rate determined by either the data rate-generated clock signal or an external local system clock. Some embodiments employ a local system clock that operates independently from the clock generated from the received data, and which controls the rate of data sent from the elasticity buffer and other local circuitry. In such embodiments, the elasticity buffer will not overrun with received data if the local clock frequency is close to the received data rate because dead space exists between received packets and allows emptying of the buffer. Although a specific configuration is shown here, it will be obvious to those skilled in the art that many methods of receiving data and repeating the data at a regular rate corresponding to a generated clock signal exist, all of which are consistent with the present invention.

If the received data is determined to be of a valid signal level, a squelch signal is in some embodiments sent to either the detector 204, the first shift register 205, or both. The determination of signal level is in some embodiments performed by a squelch circuit that comprises a part of the clock regeneration circuit, and in still further embodiments serves to activate the clock regeneration circuit upon detection of a valid signal level.

Once the squelch signal is received by the detector or the first shift register, the received data is provided from the buffer 202 to the first shift register 205 and the data in the first shift register 205 is monitored by detector 204 via a data connection 206. The detector monitors for a selected data pattern such as an end of sync signal, and sends a transmit enable signal via transmit enable connection 209 upon recognition of the selected data pattern.

In some embodiments of the invention, the received data is sent from the first shift register 205 to a second shift register 208 via a data connection 207, and data is provided from the second shift register to other circuitry within the hub or the USB system. The transmit enable signal connection 209 is employed in some embodiments to enable other circuitry to receive data provided by the repeater circuit shown in FIG. 2, further ensuring that data that is not valid is not passed on or retransmitted throughout the USB system.

In one embodiment of the invention, the first shift register 205 is a 6-bit shift register, and the second shift register 208 is a seven bit shift register. The detector monitors the first shift register for the last six bits of the end of sync signal, which in one embodiment is the string "KKJKJK". When the last six bits of the end of sync pattern are recognized by the detector as being present in the first shift register, the detector causes the first seven bits of the end of sync pattern, which in this example embodiment is the string "KJKJKJK", to be loaded into the second shift register. The first shift register and the second shift register in some embodiments are logical parts of the same shift register.

Figure 3:
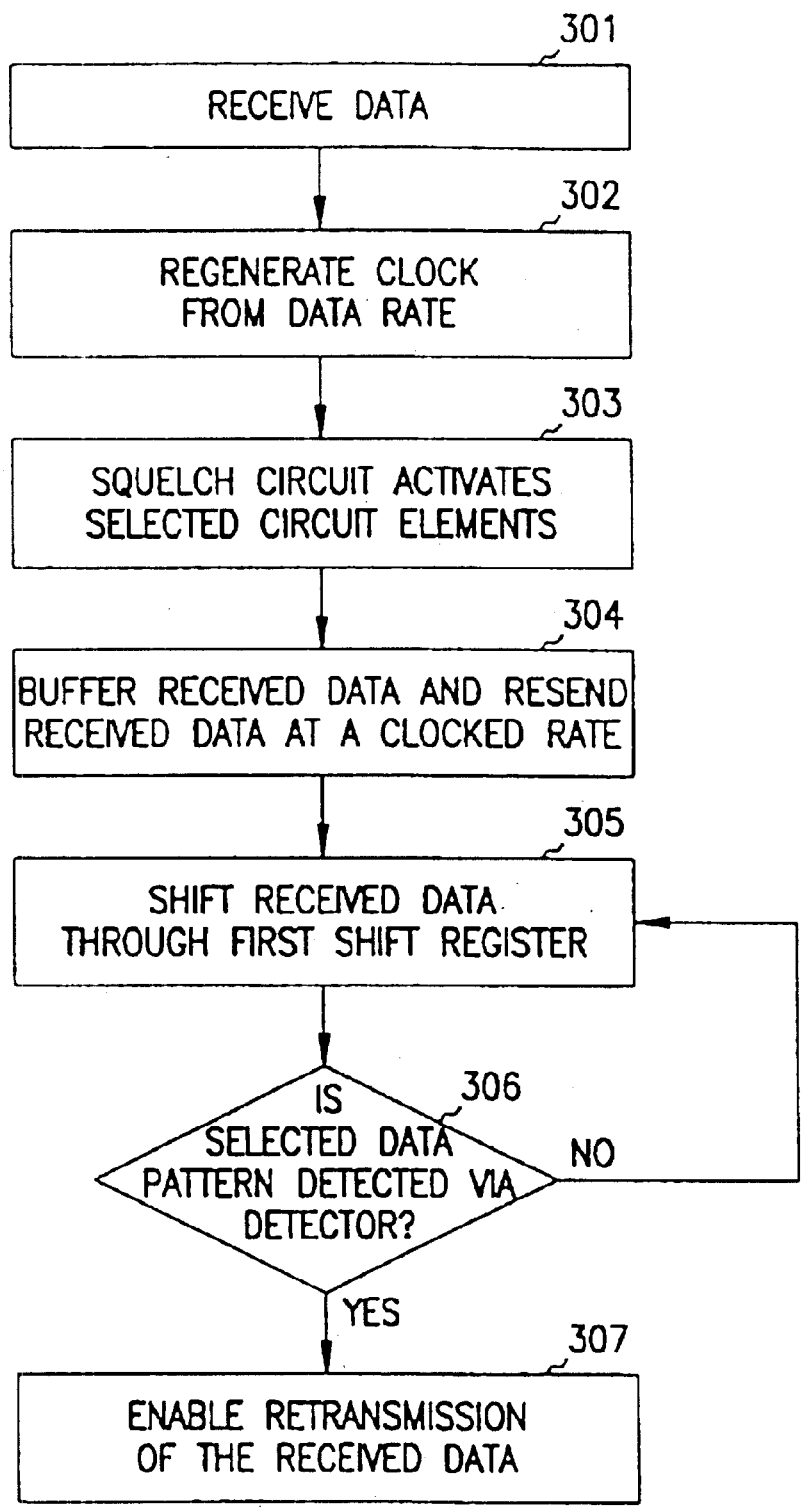
FIG. 3 is a flowchart of a method of retransmitting a data signal in a Universal Serial Bus repeater, consistent with an embodiment of the present invention.

FIG. 3 is a flowchart of a method of practicing the invention, such as may be performed with the circuit shown in the block diagram of FIG. 2. At 301, incoming data, comprising either valid data or noise, is received. At 302, a clock signal is regenerated from the data rate of the incoming data. The clock signal is regenerated in various embodiments via a phase-locked loop, a digital locked loop, or any other suitable method of regenerating a clock signal from a digital data stream. A squelch circuit activates selected circuit elements, enabling them to perform certain functions on recognition that a received signal with a valid signal level is detected. The selected circuit elements in various embodiments include a buffer, the clock regeneration circuit, a detector, a shift register, or any combination of these or other circuit components.

A buffer receives the incoming data and resends the data at a constant rate at 304, based on the clock signal generated at 302. The data provided from the buffer is received by a first shift register, which when active receives data bit by bit and shifts the data through bit locations in the register as new data is received. A detector is connected to the first shift register, and at 306 determines whether the data currently in the shift register matches a selected data pattern. In some embodiments of the invention, the selected data pattern is an end of sync pattern or a portion of an end of sync pattern. If the selected data pattern is detected, the detector provides a signal causing the received data to be retransmitted. Some embodiments of the invention incorporate a second shift register as disclosed in discussion relating to FIG. 2, and enabling retransmission of the received data in these embodiments occurs as was previously described. In various embodiments of the invention, the detector generates a signal at 306 upon detection of the selected data pattern that is provided to various circuit components, including in some embodiments components external to the invention, that enables the components to receive and process data.

Example embodiments of the invention as described have included detection of an end of sync signal, but in various other embodiments may include detection of other signals and regeneration of these signals via an enhanced detector circuit operable to cause regeneration of these signals. For example, the selected data pattern to be detected in the detector in some embodiments is a start of frame packet ID pattern and an end of packet pattern. If an end of packet pattern is detected following a start of frame packet ID pattern identifying the current packet as a start of frame packet, a 40-bit end of packet pattern is regenerated and transmitted. If an end of packet pattern is detected that is not part of a start of frame packet, a standard 8-bit end of packet pattern is regenerated and transmitted. The apparatus and method of the present invention may be adapted to recognize and regenerate or repeat various other signals, and are limited only by the scope of the claims.

The present invention provides a method and apparatus that enable recognition of a selected data pattern in received data, and regeneration or retransmission of recognized data. In some embodiments, the invention recognizes end of sync symbols and enables regeneration the end of sync signal and retransmission of subsequently received data that is known to be valid. Such an embodiment prevents retransmission of noise or invalid data, and causes retransmission of the end of sync signal recognized by the invention. In further embodiments, the invention recognizes other symbols such as an end of packet pattern, in which the invention further ensures proper regeneration and alignment of the end of packet pattern which are dependent on whether the current packet is detected to be a start of frame packet.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A Universal Serial Bus repeater, comprising:
   a clock regeneration circuit, operable to generate a clock signal based on the rate of received data;
   a buffer operable to store received data and to resend the received data at a rate controlled by the clock regeneration circuit;
   a first shift register operable to receive stored data from the buffer;
   a detector operable to detect a selected data pattern within the received data shifting through the first shift register, and to further enable retransmission of data upon recognition of the data pattern; and
   a second shift register operable to receive data from the first shift register when activated by the detector upon the detector recognizing the selected data pattern; the second shift register operable to receive shifted data from the first shift register and operable to retransmit data.

2. A universal serial bus repeater, comprising:
   a clock regeneration circuit, operable to generate a clock signal based on the rate of a received data;
   a buffer operable to store received data and to resend the received data at a rate controlled by the clock regeneration circuit;
   a first shift register operable to receive stored data from the buffer;
   a detector operable to detect a selected data pattern within the received data shifting through the first shift register and to further enable retransmission of data upon recognition of the data pattern; and
   a second shift register operable to receive data from the first shift register when activated by the detector upon the detector recognizing the selected data pattern;
   Wherein the selected data pattern comprises an end of sync pattern.

3. A Universal Serial Bus repeater, comprising:
   a clock regeneration circuit, operable to generate a clock signal based on the rate of received data;
   a buffer operable to store received data and to resend the received data at a rate controlled by the clock regeneration circuit;
   a first shift register operable to receive stored data from the buffer; and
   a detector operable to detect a selected data pattern within the received data shifting through the first shift register, and to further enable retransmission of data upon recognition of the data pattern;
   wherein the selected data pattern comprises a start of frame packet ID pattern, the detector further operable to detect an end of packet pattern and to cause transmission of an 8-bit end of packet pattern if the current packet is not detected to be a start of frame packet and cause transmission of a 40-bit end of packet pattern if the current packet is detected to be a start of frame packet.

4. A method of retransmitting a data signal in a Universal Serial Bus repeater, the method comprising:
   regenerating a clock signal based on the rate of received data;
   buffering received data and resending the received data from a buffer at a rate controlled by the clock signal;
   receiving the resent data in a first shift register and shifting the received data through the first shift register;
   detecting a selected data pattern in the received data shifting through the first shift register via a detector;
   enabling retransmission of the received data upon recognition of the selected data pattern;
   shifting the received data from the first shift register to a second shift register one bit at a time upon detecting the selected data pattern; and
   retransmitting the received data from the second shift register upon enabling of retransmission of the received data.

5. A method for retransmitting a data signal in a universal serial bus repeater, the method:
   regenerating a clock signal based on the rate of a received data;
   buffering received data and resending the received data from a buffer at a rate controlled by the clock signal;
   receiving the resent data in a first shift register and shifting the receive data through the first shift register
   detecting a selected data pattern in the received data shifting through the first shift register via a detector; and
   shifting the received data from the first shift register to a second shift register upon detecting the selected data pattern;
   Wherein the selected data pattern comprises an end of sync pattern.

6. A method of retransmitting a data signal in a Universal Serial Bus repeater, the method comprising:
   regenerating a clock signal based on the rate of received data;
   buffering received data and resending the received data from a buffer at a rate controlled by the clock signal;
   receiving the resent data in a first shift register and shifting the received data through the first shift register;
   detecting a selected data Pattern in the received data shifting through the first shift register via a detector, wherein the selected data pattern to be detected comprises a start of frame packet ID pattern,
   enabling retransmission of the received data upon recognition of the selected data pattern;
   detecting an end of packet pattern;
   retransmitting an 8-bit end of packet pattern if the current packet is not detected to be a start of frame packet; and
   retransmitting a 40-bit end of packet pattern if the current packet is detected to be a start of frame packet.

7. A Universal Serial Bus repeater, comprising:
   a digital locked loop clock regeneration circuit, operable to generate a clock signal based on the rate of received data;

a squelch circuit, operable to disable selected portions of the repeater circuit until a specified received signal level is detected;

a buffer operable to store received data and to resend the received data at a rate controlled by the clock regeneration circuit;

a first shift register operable to receive stored data from the buffer;

a detector operable to detect an end of sync data pattern within the received data shifting through the first shift register and further operable to enable shifting the received data from the first shift register to a second shift register upon recognition of the end of sync signal; and wherein the second shift register is operable to receive data from the first shift register one bit at a time and to retransmit the received data.

8. The Universal Serial Bus repeater of claim 7, wherein the repeater comprises a part of a Universal Serial Bus hub.

9. The Universal Serial Bus repeater of claim 7, wherein the selected portions of the repeater circuit deactivated by the squelch circuit include the detector.

10. The Universal Serial Bus repeater of claim 7, wherein the selected portions of the repeater circuit deactivated by the squelch circuit include the buffer.

* * * * *